Nov. 19, 1957 R. E. MEYER 2,813,395

FLAT TYPE VARIABLE AREA THRUST NOZZLE HAVING AN ACTUATING MECHANISM INCLUDING A MOVABLE DUCT

Filed June 29, 1951 3 Sheets-Sheet 1

Inventor
Robert E. Meyer
by Jack N. McCarthy
Agent

Nov. 19, 1957 R. E. MEYER 2,813,395

FLAT TYPE VARIABLE AREA THRUST NOZZLE HAVING AN ACTUATING MECHANISM INCLUDING A MOVABLE DUCT

Filed June 29, 1951 3 Sheets-Sheet 2

Inventor
Robert E. Meyer
by Jack N. McCarthy
Agent

Nov. 19, 1957 R. E. MEYER 2,813,395
FLAT TYPE VARIABLE AREA THRUST NOZZLE HAVING AN
ACTUATING MECHANISM INCLUDING A MOVABLE DUCT
Filed June 29, 1951 3 Sheets-Sheet 3

Inventor
Robert E. Meyer
By Jack N. McCarthy
Agent

United States Patent Office 2,813,395

Patented Nov. 19, 1957

1

2,813,395

FLAP TYPE VARIABLE AREA THRUST NOZZLE HAVING AN ACTUATING MECHANISM INCLUDING A MOVABLE DUCT

Robert E. Meyer, Glastonbury, Conn., assignor to United Aircraft Corporation, East Hartford, Conn., a corporation of Delaware Application June 29, 1951, Serial No. 234,256

3 Claims. (Cl. 60—35.6)

This invention relates to a propelling nozzle for a turbojet engine.

An object of this invention is to provide a propelling nozzle of the type which can be positioned at any number of positions between two limits.

A further object is to provide a nozzle which incorporates a cooling ejector.

Another object is to provide a nozzle having the actuating rods stressed in tension thus effecting a weight saving since heavy compression loaded rods are not necessary.

A further object is to provide a nozzle which for each position of the nozzle will provide a substantially circular opening.

Another object is to provide a nozzle in which the actuating leverage is variable so that the mechanical advantage is greatest when the gas forces on the nozzle are the greatest.

Figure 1:
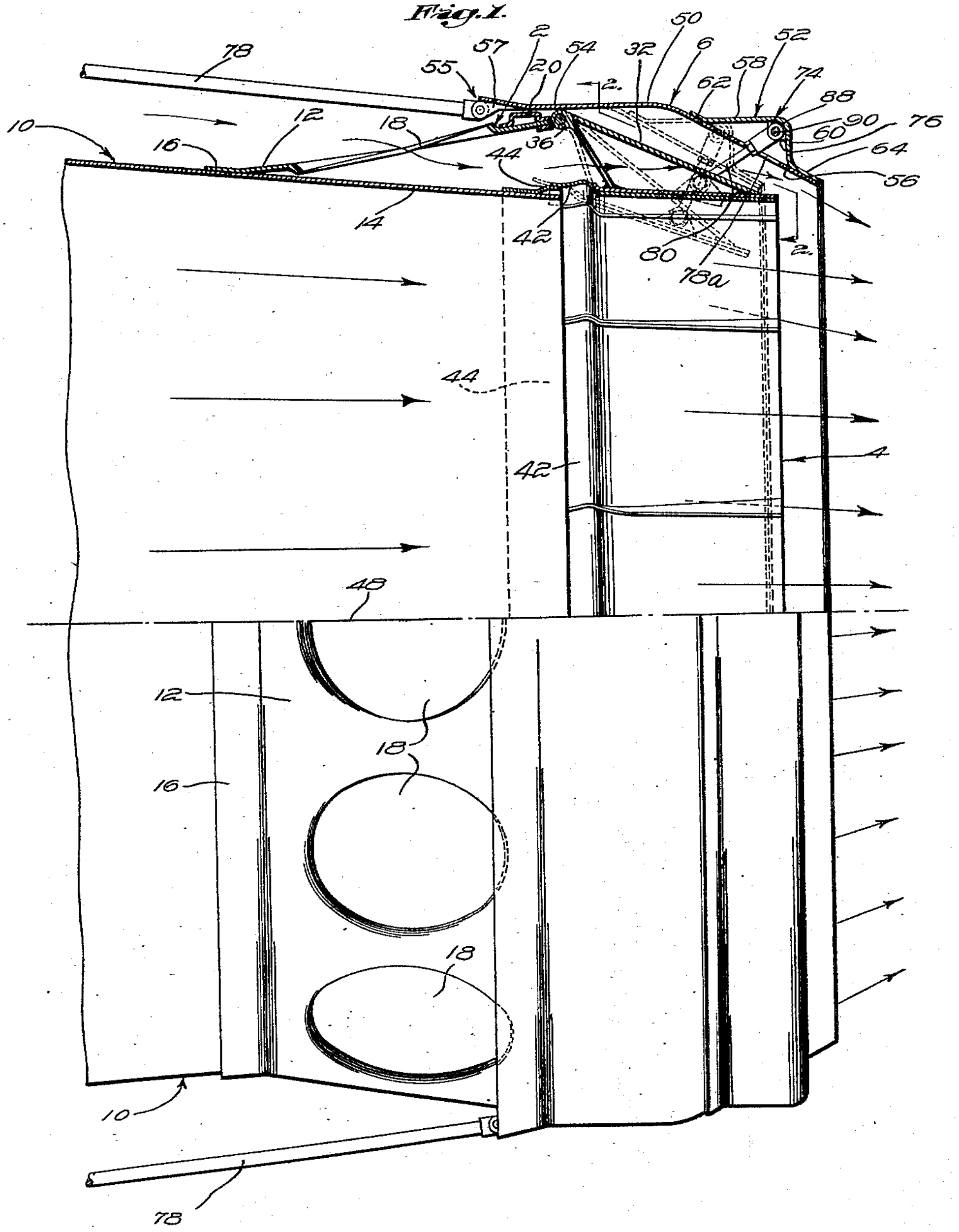
Fig. 1 is a view of the propelling nozzle partially in section shown attached to a turbojet engine.

Referring to Fig. 1, the nozzle shown consists of three main parts, (1) the flap supporting ring 2, (2) the flaps 4 and (3) the outer ring duct, or shroud, 6. These three parts are interconnected by linkages and pivots.

The flap supporting ring which is fixedly attached to the engine 10 includes a ring member 12, located around the exhaust duct 14 of the engine 10 with its forward end attached to the engine by an integral flange 16. The rest of the ring member is frusto-conical in shape and tapers outwardly toward the rear. This portion of the ring member 12 which is frusto-conical in shape has a plurality of large holes 18 to permit air to pass into outer duct 6 or be drawn therethrough in a manner to be later described. A stiffening ring 20, is fixedly mounted around the rear free end of ring member 12. This ring 20 has pairs of bosses 22 mounted thereon equally spaced therearound for pivotally mounting the flaps 4.

Each flap 4 consists of a plate 24 with a sealing plate 26 fixed thereto for sealing the triangular clearance space 28 between adjacent plates 24 when the flaps are open. Each flap has an arm 30 on which said flap pivots. These arms 30 consist of a stamped member 32 which is fixed to said sealing plate such as by welding. They have integral strengthening ribs 34 to hold the flaps in shape. A boss 36 is located on the free end of each arm with a hole therethrough. Each boss 36 is positioned between a pair of bosses 22 on the stiffener ring 20 and is pivotally held by a bolt 38. A roller 40 is rotatably mounted on one end of each bolt. When gas is being discharged out the exhaust duct 14 of the engine the gas pressure on

2 the flaps 4 keeps the flaps extended and the outer duct 6 in a central position. When the engine is shut down the rollers 40 support the outer duct in substantially central position.

Figure 4:
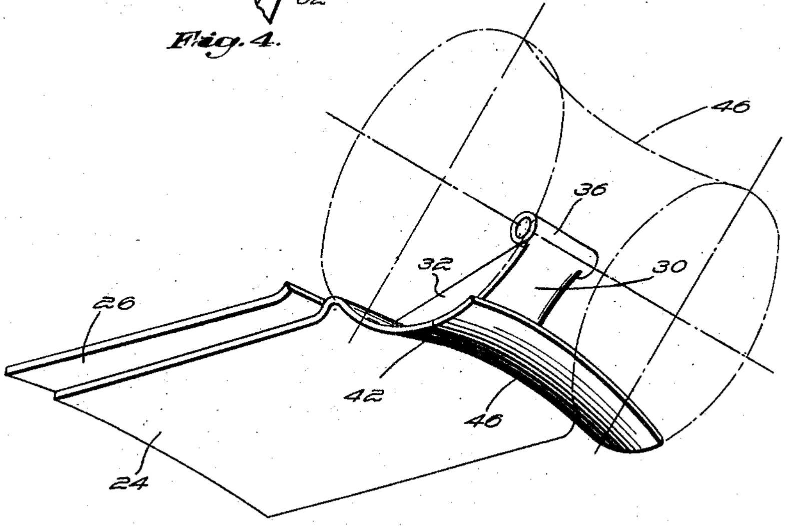
Fig. 4 is an enlarged view of the flap showing how the curved sealing portion is formed.
Figure 5:
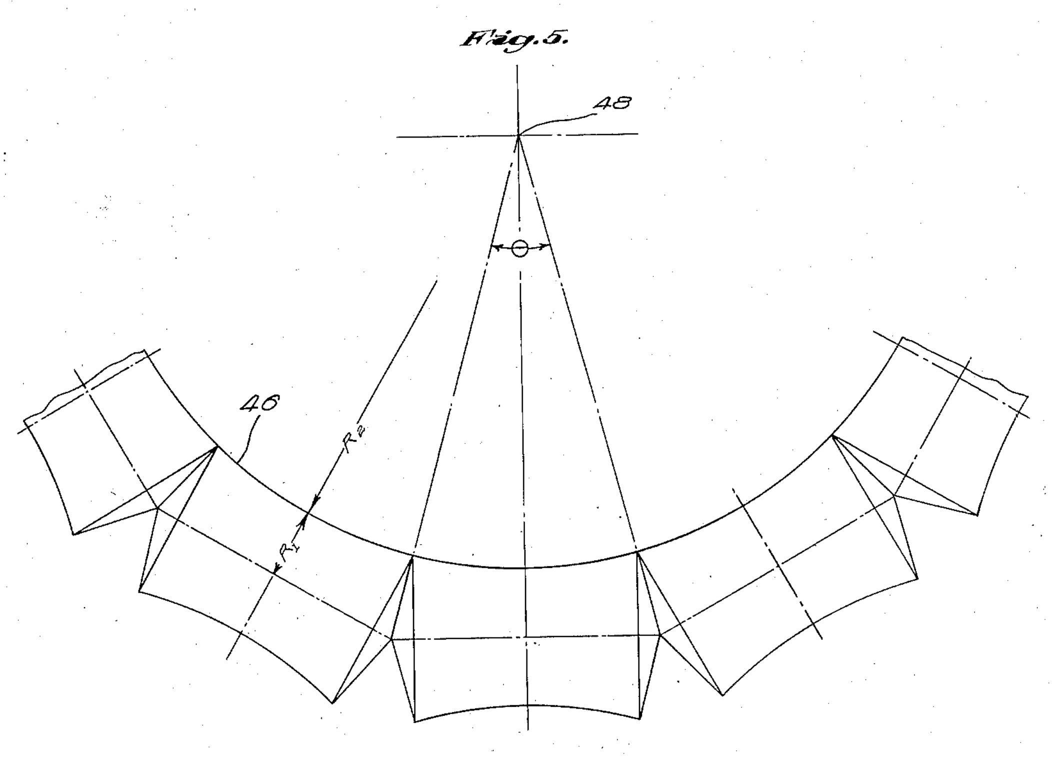
Fig. 5 is a view showing the geometric development of the seal of the flap.
Figure 6:
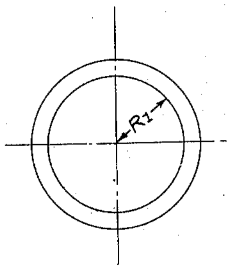
Fig. 6 is a view taken through the center of one of the geometric figures in Fig. 5.

Each flap 4 has a curved portion 42 which is formed to mate with a sealing ring 44 fixed to the engine duct. This curved portion is formed in a manner as shown in Figs. 4 and 5. The radius R–2 is used to form the curve along line 46. This radius is the distance between the centerline 48 of the engine and the sealing ring 44. R–1 is the distance between the center of the boss 36 of each flap and the sealing ring 44 mounted on the engine. The angle $\theta$ is derived by dividing the number of degrees in a circle by the number of flaps desired. In Fig. 5 the numercial value of degrees for the angle is 30 which has been derived by assuming a total of twelve flaps. When these flaps are mounted with a point on the ends of the curved portions 42 of adjacent flaps abutting each other, a 100% seal is effected in any operative position of the flaps along the sealing ring 44. It can be seen in Fig. 5 that as the geometric figures of spool shape are rotated, the inner circle 46 formed by the figures remain unbroken in any operative position of the figures.

The outer duct, or shroud, 6 includes the duct member 50 and strengthening ring 52. The duct member 50 is formed with its forward part 54 cylindrical in shape and its rear part 56 frusto-conical in shape tapering inwardly towards the rear. The cylindrical part 54 is located around the free end of the ring member 12 and stiffening ring 20. A control bracket 55 is located on each side of the cylindrical part at its forward end. While only two (2) control brackets are shown, any number may be used. Each bracket consists of two bosses 57 which are placed to receive the end of an actuating rod 78 or other actuating means.

The strengthening ring 52 encircles the outer side of the frusto-conical part of the outer duct. This ring has a cylindrical part 58 extending rearwardly from said frusto-conical part of the outer duct and a part 60 bent down therefrom which meets with said frusto-conical part of the outer duct. Flanges 62 and 64 which are integral with said ring are fixed as by welding to said frusto-conical part of the outer duct.

Figure 2:
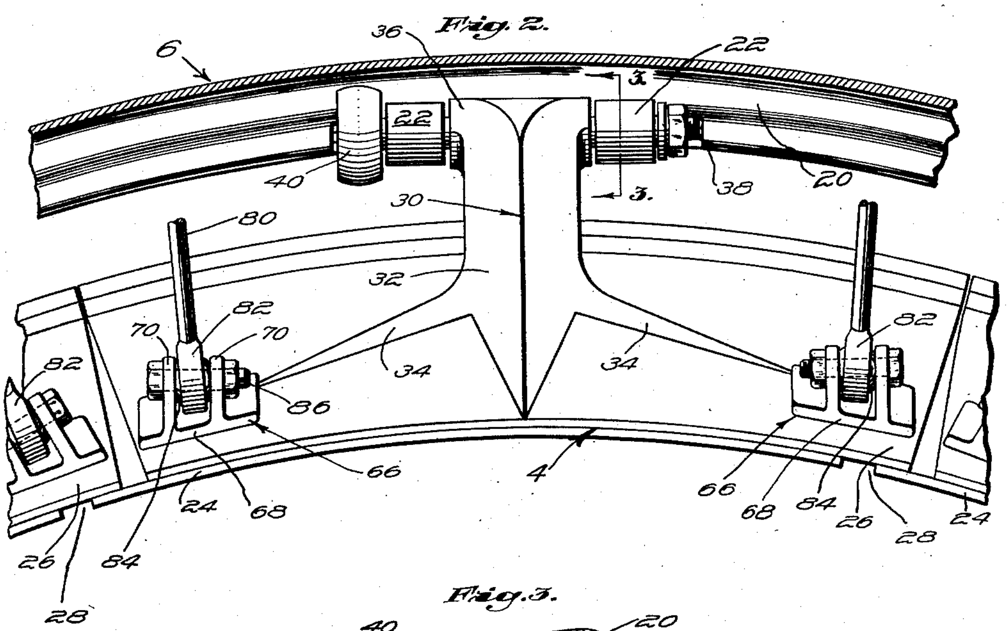
Fig. 2 is a view taken on the line 2—2 of Fig. 1.
Figure 3:
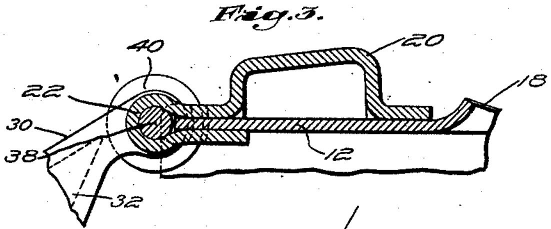
Fig. 3 is a view taken on the line 3—3 of Fig. 2.

Two actuating brackets 66, Fig. 2, are fixed to each flap, one on each side thereof. Each bracket consists of a plate 68 with two bosses 70 extending therefrom, each boss having a hole therethrough for a purpose to be described later. A mating bracket 74, Fig. 1, one for each actuating bracket 66, is fixed to the inside of the strengthening ring 52. Each bracket 74 consists of a pair of bosses 76, each boss having a hole therethrough for a purpose to be described later. Slots **78*a* are located in the frusto-conical section of the outer duct, one slot being between each actuating bracket 66 and its mating bracket 74. An adjustable link 80 having a self-aligning bearing on each end passes through each slot 78*a* with the self-aligning bearing 82 at one end having its ball 84 held between the bosses of an actuating bracket 66 by a bolt 86 and the self-aligning bearing 88 of the other end having its ball member held between the bosses 76 of the mating bracket 74 by a bolt 90**.

The construction of this nozzle places the actuating rod 78 in tension during engine operation which effects a weight saving since heavy compression loaded rods are not needed. It can be seen that when the engine is in operation the force of the exhaust will always tend to move the flaps in an opening direction. The links 80 are so arranged that as the outer duct, or stroud, 6 is moved forward they become more nearly radial thereby increasing the mechanical advantage of the system. This is advantageous since the force acting on the flaps also increases with this movement of the outer duct since the flaps are then moving to a closed position.

The cooling ejector action of the nozzle varies the amount of cooling air pumped. As mentioned hereinbefore, holes 18 are provided to permit air to be drawn into the annular passage between outer duct 6 and flaps 4. It can be seen that when the nozzle is in its full open position (shown in solid lines in Fig. 1), the ejector action is the greatest due to the position of the trailing edges of the outer duct with respect to the flaps, the trailing edges of he flaps being located upstream of and adjacent to the trailing edge of the duct and defining a diameter slightly smaller than the trailing edge of the duct. This construction is especially advantageous when the nozzle is being used on a turbojet engine including an afterburner since with the afterburner in operation the nozzle will be in full open position making the ejector cooling action the greatest when the temperatures reached are the highest.

*Operation*

Assuming the device to be in the position shown by the solid lines in Fig. 1, when the actuating rod 78 is moved to the left, or front, this action moves the outer duct, or shroud, 6 to the front. This movement of the outer duct, or shroud, pivots each of the flaps 4 around its pivotal mounting inwardly towards a closed position through links 80. If the nozzle is to be opened, the control rod 78 is moved to the right, or rear and through a sequence of operation, the reverse of that described above, the flaps are moved in an opening direction.

Although a specific nozzle has been shown and described herein for purpose of illustration, it will be evident to those skilled in the art that the invention is capable of various modifications and adaptations within the scope of the appended claims. Another variable area nozzle of the multiple flap type is shown and claimed in co-pending application Serial No. 234,228, filed June 29, 1951.

I claim:

1. In combination, a jet engine discharge duct terminating in a thrust nozzle, an axially elongated ring surrounding the aft portion of said duct having its forward end fixed to said duct well ahead of said nozzle and extending aft in overlying relation to said duct to form an unobstructed annular passage between the two of substantial length which is open at the rear, the free end of said ring being spaced radially from said duct a substantial distance and terminating substantially in the vertical plane including said nozzle, a plurality of flaps located around the periphery of said nozzle forming extensions of said duct, arms extending radially from said flaps and pivoted at their extended ends on the free end of said ring, means providing for an annular stream of cooling air in said annular passage between said ring and said duct including a series of openings at the forward end of said ring, means for effecting an ejector action at said flaps to draw cooling air through said annular passage comprising mechanism for reciprocating said flaps including an outer duct surrounding said flaps and extending forward over the free end of said ring, links pivotally connecting said outer duct with said flaps for pivoting said flaps upon axial movement of said outer duct, and means for axially reciprocating said outer duct.

2. In combination, a jet engine discharge duct terminating in a thrust nozzle, a frusto-conical ring surrounding said duct having its smaller end fixed to said duct well forward of said nozzle and having its larger end spaced radially a substantial distance from said nozzle, pairs of bosses spaced about the periphery of said ring adjacent its larger end, a plurality of flaps located around the periphery of said nozzle forming extensions of said duct, said flaps having radially extended arms each terminating in a boss receivable between a pair of bosses on said ring, pivot means extending through each pair of bosses and an intermediate boss on one of said flaps, and means providing for a flow of cooling air over the supporting arms for said flaps in the expanding annular space between said pivot means and the hot engine discharge duct including a series of openings in the conical surface of said ring, means for reciprocating said flaps including an outer duct enclosing said flaps and extending forward over said pivot means, links pivotally connecting said outer duct with certain of said flaps for pivoting said flaps upon axial movement of said outer duct, and means for axially reciprocating said outer duct.

3. In combination, a jet engine discharge duct terminating in a thrust nozzle, a frusto-conical ring surrounding said duct having its smaller end fixed to said duct well forward of said nozzle and having its larger end spaced radially a substantial distance from said nozzle, an annular stiffening member fixed to the larger end of said ring having pairs of bosses spaced about its periphery, a plurality of flaps located around the periphery of said nozzle forming extensions of said duct, said flaps having radially extended arms each terminating in a boss receivable between a pair of bosses on said ring, pivot means extending through each pair of bosses on said ring and an intermediate boss on one of said flaps, each of said flaps having a curved forward sealing edge struck about its pivot means as a center and engagesable with said nozzle in all positions of the flaps, rollers carried by certain of said pivot means having their peripheries projecting radially beyond the aft periphery of said ring, and means providing for a flow of cooling air over the supporting arms for said flaps in the expanding annular space between said pivot means and the hot engine discharge duct including a series of holes in the conical surface of said ring, means for reciprocating said flaps including an outer duct enclosing said flaps and extending forward over the rollers on said stiffening ring, links located in said flow of cooling air and pivotally connecting said outer duct with certain of said flaps for pivoting said flaps upon axial movement of said outer duct, and means for axially reciprocating said outer duct.

References Cited in the file of this patent

UNITED STATES PATENTS

| | | |
|---|---|---|
| 157,527 | Leggett | Dec. 8, 1874 |
| 186,310 | Curtis | Jan. 16, 1877 |
| 1,798,141 | Chillingworth | Mar. 31, 1931 |
| 2,481,330 | Neal | Sept. 6, 1949 |
| 2,483,401 | Cole | Oct. 4, 1949 |
| 2,496,509 | Wolf | Feb. 7, 1950 |
| 2,575,735 | Servanty | Nov. 20, 1951 |
| 2,597,253 | Melchior | May 20, 1952 |
| 2,603,060 | Brown | July 15, 1952 |
| 2,603,062 | Weiler et al. | July 15, 1952 |
| 2,625,008 | Crook | Jan. 13, 1953 |
| 2,637,163 | Brown et al. | May 5, 1953 |
| 2,693,078 | Laucher | Nov. 2, 1954 |
| 2,697,907 | Gaubatz | Dec. 28, 1954 |